(12) United States Patent
Whitaker et al.

(10) Patent No.: US 11,713,118 B1
(45) Date of Patent: Aug. 1, 2023

(54) CONSTANT TENSION TETHER MANAGEMENT SYSTEM FOR A TETHERED AIRCRAFT

(71) Applicant: Hoverfly Technologies, Inc., Orlando, FL (US)

(72) Inventors: Lucas Colt Whitaker, San Leandro, CA (US); Alfred D. Ducharme, Oviedo, FL (US)

(73) Assignee: Hoverfly Technologies. Inc., Orlando, FL (US)

( * ) Notice: Subject to any disclaimer, the term of this patent is extended or adjusted under 35 U.S.C. 154(b) by 428 days.

(21) Appl. No.: 17/105,090

(22) Filed: Nov. 25, 2020

Related U.S. Application Data

(63) Continuation-in-part of application No. 15/912,929, filed on Mar. 6, 2018, now abandoned.

(60) Provisional application No. 62/467,626, filed on Mar. 6, 2017.

(51) Int. Cl.
*B64C 39/02* (2023.01)
*B64F 3/00* (2006.01)

(52) U.S. Cl.
CPC .......... *B64C 39/022* (2013.01); *B64C 39/024* (2013.01); *B64F 3/00* (2013.01); *B64U 2201/202* (2023.01)

(58) Field of Classification Search
CPC .... B65H 59/38; B65H 59/385; B65H 59/388; B64C 39/022; B64C 39/024
See application file for complete search history.

(56) References Cited

U.S. PATENT DOCUMENTS

| 1,433,079 | A | | 10/1922 | Jett |
| 3,365,075 | A | * | 1/1968 | Van Gils ................ B63B 23/40 254/288 |
| 4,318,533 | A | | 3/1982 | Port |
| 4,752,043 | A | | 6/1988 | Heinzer |
| 4,981,456 | A | | 1/1991 | Sato et al. |
| 8,421,257 | B2 | | 4/2013 | Chernyshov |

(Continued)

FOREIGN PATENT DOCUMENTS

| DE | 646279 C | 6/1937 |
| EP | 2 228 301 A2 | 9/2010 |

(Continued)

OTHER PUBLICATIONS

International Search Report and Written Opinion dated Jun. 21, 2018 for International Patent Application No. PCT/US2018-021199.

(Continued)

*Primary Examiner* — Philip J Bonzell
*Assistant Examiner* — Michael B. Kreiner
(74) *Attorney, Agent, or Firm* — Howard M. Gitten, Esq.; Lewis Brisbois Bisgaard & Smith LLP

(57) ABSTRACT

A constant tension tether management system for tethered aircraft includes a ground station for operatively coupling to an unmanned aerial vehicle. The ground station includes a spool rotatably disposed within the ground station and adapted to support a tether thereon. A first pulley is rotatably mounted within the ground station along a tether travel path. A second pulley is rotatably disposed within the ground station and moves in translation along the tether travel path. The first pulley is disposed along the tether travel path between the spool and the second pulley.

12 Claims, 2 Drawing Sheets

(56) References Cited

U.S. PATENT DOCUMENTS

| | | |
|---|---|---|
| 9,290,269 B2 | 3/2016 | Walker et al. |
| 2009/0178757 A1 | 7/2009 | Cocovi et al. |
| 2010/0230968 A1 | 9/2010 | Chernyshov |
| 2014/0263852 A1 | 9/2014 | Walker et al. |

FOREIGN PATENT DOCUMENTS

| | | |
|---|---|---|
| WO | 2010009434 A2 | 1/2010 |
| WO | 2014203593 A1 | 12/2014 |
| WO | 2015173492 A1 | 11/2015 |

OTHER PUBLICATIONS

Extended European Search Report dated Nov. 18, 2020 for corresponding European Patent Application No. 18764568.4.
Cober, Greg, "Tension Control: Dancer Systems Defined," Published Apr. 16, 2009, https://www.pffc-online.com/ar/7076-tension-control-dancer-0409. Warner Electric. www.warnerelectric.com.

\* cited by examiner

CONSTANT TENSION TETHER MANAGEMENT SYSTEM FOR A TETHERED AIRCRAFT

CROSS REFERENCE TO RELATED APPLICATION

This application is a continuation-in-part of U.S. patent application Ser. No. 15/912,929 filed Mar. 6, 2018 which claims priority to U.S. Provisional Application No. 62/467,626 filed Mar. 6, 2017, the contents of which are herein incorporated by reference in their entirety.

BACKGROUND OF THE INVENTION

The following invention is directed to a system for controlling the position of a tethered unmanned aerial vehicle (UAV), and more particularly, to control the operation of the tether of the tethered unmanned aerial vehicle by controlling the tension of the tether connected thereto to maintain a desired tether strain.

Unmanned aerial vehicles, have the ability to hover. UAVs, such as multiple rotor helicopters, can be tethered for safety, communications, and long term power. This increases the ability of these crafts to stay aloft. This provides the benefit of being able to maintain a consistent visual monitoring of a specified area.

A tethered UAV is coupled to a ground-based counterpart, including a tether management system, to reel the tether in or out as needed. However, the UAV also requires the freedom to climb, descend, translate, and operate in varying wind speeds, all with minimum load variation on the tether. These aircraft typically rely on the skill of an on-site pilot to maintain constant tether tension in a variety of conditions. Other systems rely on complex structures such as either on board tension sensors, optical sensors or satellite navigation in order to maintain the UAV positioning location, and resulting tether tension relative to the ground base.

These systems are satisfactory, however they are extremely complex so that, traditional methods like those above result in a high cost of manufacture and maintenance as well as a high probability of failure.

Accordingly, a system and method for overcoming the shortcomings of the prior art is desired.

SUMMARY OF THE INVENTION

A tension tether management system for tethered aircraft has a spool rotatably disposed within a ground station. A first pulley is rotatably mounted within the ground station along a tether travel path. A second pulley is rotatably disposed within the ground station and translatable along the tether travel path. The first pulley is disposed along the tether travel path between the spool and the second pulley.

BRIEF DESCRIPTION OF THE DRAWINGS

The present disclosure is better understood by reading the detailed description with reference to the accompanying drawing figures in which the reference numerals denote similar structure and refer to the elements throughout in which.

DESCRIPTION OF THE PREFERRED EMBODIMENT

Figure 1:
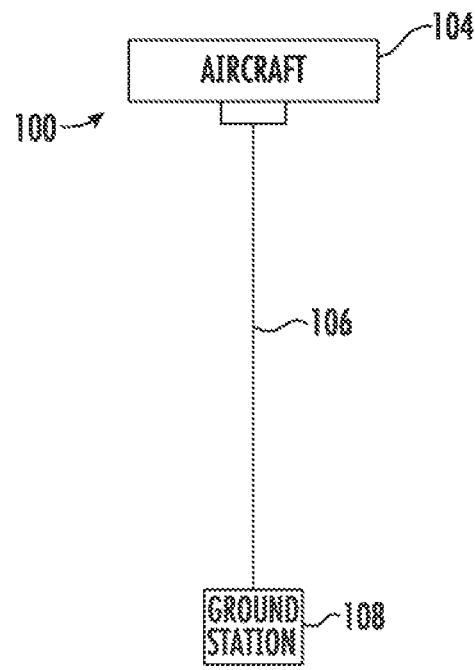
FIG. 1 is a schematic diagram of the unmanned aerial vehicle constructed in accordance with the invention.
Figure 2:
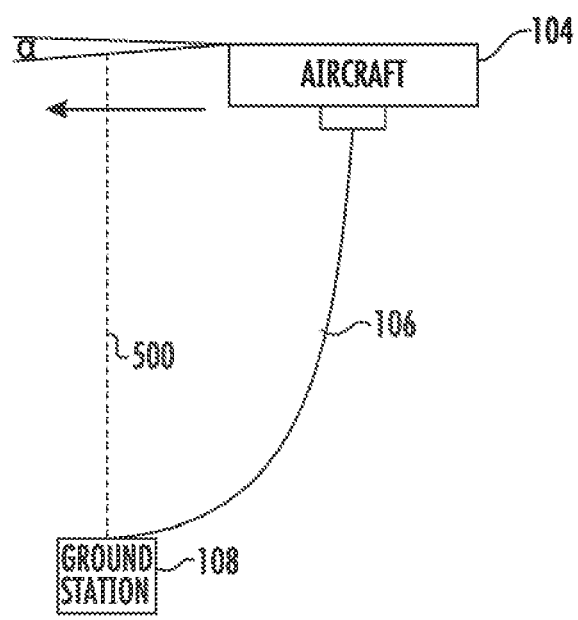
FIG. 2 is a schematic diagram demonstrating operation of the invention intended to maintain the position of the aircraft.

Turning now to the drawings, in which similar reference characters denote similar elements throughout the several views, the figures illustrating a tethered unmanned aerial vehicle. Reference is made to FIGS. 1 and 2 wherein a schematic diagram of the invention in accordance with a preferred embodiment thereof is provided. Not part of the system is a tether 106, coupling aircraft 104 to ground station 108.

More specifically, as seen in FIG. 2, tether 106 attaches to aircraft 104. Because of gravity the natural tendency of the tether 106 is to hang directly below aircraft 104. When outside forces, such as wind act on the tether, force differential impose a strain on tether 106 external forces move UAV 104 from a desired location or caused it to roll. When wind, by way of example, is applied to system 100, aircraft 104 will tend to move down wind away from the desired position, in this embodiment away from normal 500 corresponding to the initial position in FIG. 1. UAV 104 moves away from normal or roles along an angle a, as seen in FIG. 2, changing the tension on tether 106 as UAV 104 moves from the desired course. However, it is desired to maintain constant tension on the tether 106, regardless of the altitude or attitude of UAV 104 so as to not interfere with separately controlled flight of UAV 104.

Figure 3:
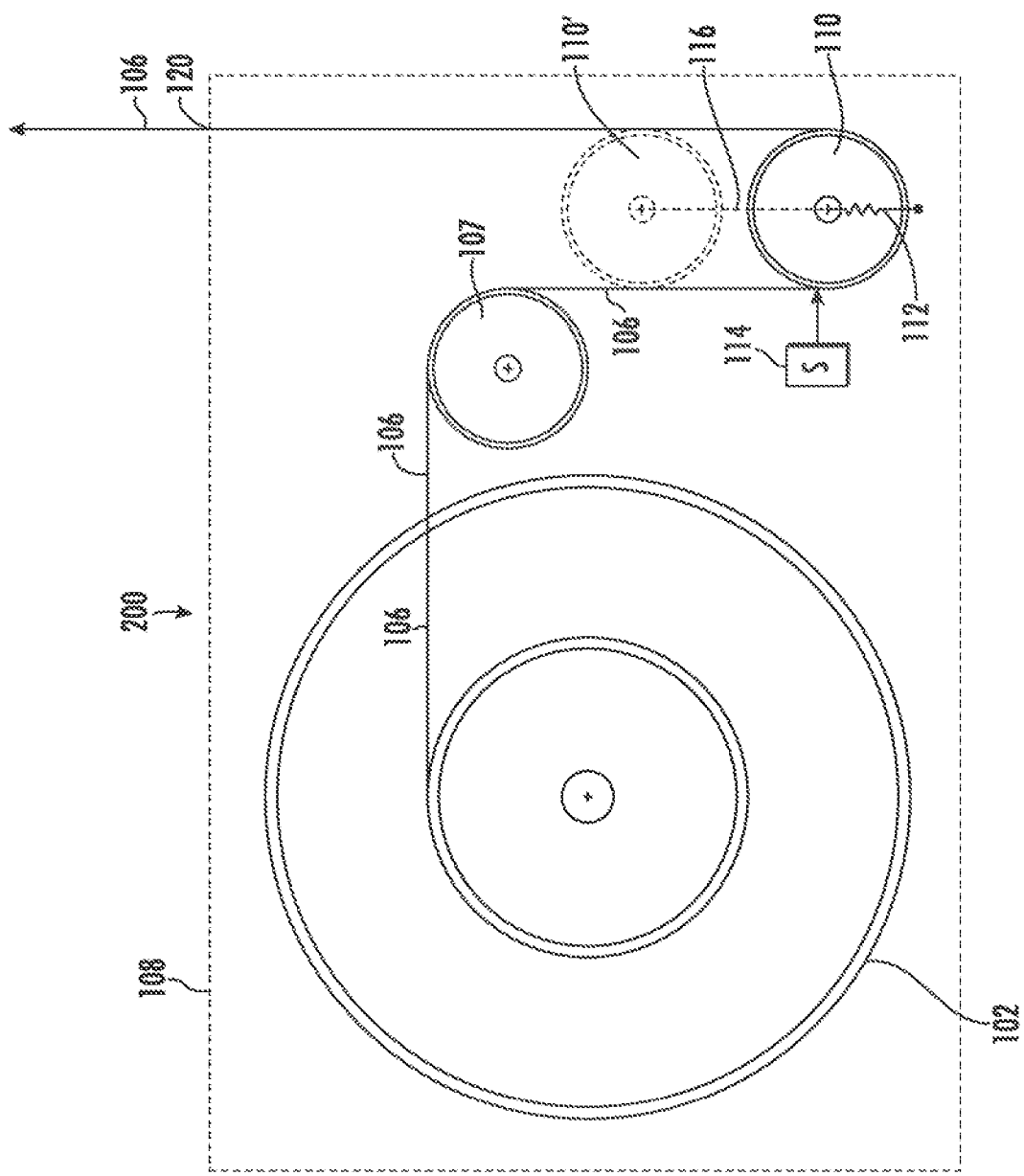
FIG. 3 is a schematic diagram of a tether management system constructed in accordance with the invention.

Reference is now made to FIG. 3 wherein a tether management system, generally indicated as 200, for controlling tether tension is shown. The tether management system 200 is housed within the housing of ground station 108. The tether management system includes a spool 102 rotatably mounted within ground station 108. Tether 106 is stored and wound about spool 102. Spool 102 is operatively coupled to a bidirectional motor (not shown), as known in the art, capable of precise movement at sufficient speeds in opposite rotational direction to accommodate for the ascent and descent of the attached UAV 102.

Tether 106 travels along a travel path from spool 102 to UAV 104. A first pulley 107, acting as a guide pulley, is disposed along the travel path within ground station 108. First pulley 107 is rotatably mounted at a fixed position within ground station 108. As tether 106 is spooled out from, or spooled into, spool 102, tether 106 comes in contact with and is guided by first pulley 107.

A second pulley 110 is rotatably mounted within ground station 108 along the tether travel path between first pulley 107 and UAV 104, and moves in translation along a linear track 116. Second pulley 110 is disposed along the travel path, in such a way, that first pulley 107 causes tether 106 to always come in contact with substantially 180° of the engaged surface of second pulley 110. Pulley 110, in a preferred nonlimiting embodiment, is mounted on a linear track 116 and is movable between a first position indicated as the pulley 110 in solid line and a second position shown in phantom as position 110'.

Tether 106, then exits ground station 108 through an exit 120 disposed in ground station 108 in a direction towards UAV 104. In this way, because second pulley 110 freely moves in a vertical direction relative to the ground between the first position and the second position, second pulley 110 will move along track 116 as the tension of tether 106 changes. A tensioning spring 112, coupled to pulley 110, and anchored to ground station 108 at another end, biases second pulley 110 towards the first position shown as 110. A sensor 114 disposed within ground station 108 to monitor a position of second pulley 110 detects the movement of second pulley 110 along the linear track 116.

In a preferred nonlimiting embodiment, second pulley 110 includes a slider, such as bearings or a low friction contact disposed within linear track 116 to enable the free travel of second pulley 110 along track 116. As a result, movement of second pulley 110 between the first position and at least the second position 110' occurs smoothly and with minimal friction. Having a known range of movement and positions, allows for the attachment of the tensioning spring 112 as well as a reference point for linear position sensor 114 to track the position of second pulley 100.

During operation, a motor drive (not shown, but known in the art) attached to spool 102 operates at varying speeds, in either one of a first direction to retract tether 106 into ground station 108, or a second direction to extend tether 106 from ground station 108 in response to the output of sensor 114 which periodically determines the position of second pulley 110 along linear track 116. Sensor 114 may be any sensor for measuring a position of an object along a straight line while offering minimal friction; such as a laser, noncontact electrical sensor, an electromechanical contact sensor or other like type position based detector.

At the same time, tensioning spring 112 provides a force on second pulley 110; biasing second pulley 110 in the direction of the first position. Tensioning spring 112 acting on movable second pulley 110, provides a tension to tether 106 that is equal to one half of the force provided by tensioning spring 112. This results from the substantially 180° wrap of tether 106 about second pulley 110. The motor applies a torque to spool 102, and therefore a tension to tether 106, until sensor 114 indicates to the motor that the linear position of the second pulley 110, as detected by sensor 114, is substantially at a pre-determined position called the set-point of the travel range along linear track 116. The first position may be the set point, but in a preferred non limiting embodiment may also be a point intermediate the first position and the second position.

The force produced by the tensioning spring, within its operating range, increases linearly with respect to its extension. In a first embodiment, tensioning spring 112, a constant tension spring, provides a constant amount of force to the tether at a pre-determined position output from the sensor 114. In a preferred non limiting embodiment tensioning spring 112, is a variable tension spring, so that the a force applied to pulley second pulley 110 changes as tensioning spring 112 becomes elongated or is compressed. As a result, a known amount of tension can be exerted on the tether by choosing the desired set-point position of the second pulley 110 with a sensed position determined by sensor 114. In effect, the motor is not directly controlling the tension of tether 106 as tether 106 leaves ground station 108. The motor works to keep pulley 110 within the range of linear track 116, and preferably centered at the pre-determined set-point position. The tension associated with the pulley 110 position is transferred to the tether 106.

During operation, when sensor 114 detects second pulley 110 moving away from the set-point along linear track 116 towards the first position, this indicates a decrease in tension on tether 106 as tensioning spring 112 overcomes this lower tension force (force in a feed direction) by tether 106. Sensor 114 outputs a signal to control the motor indicating this change. System 100 makes use of a proportional integral derivative (PID) loop to control the motor in response to outputs from sensor 114. Here, by way of nonlimiting example, a detection that second pulley 110 is moving from the set-point position along linear track 116 in the direction of the first pulley position causes the motor to reel tether 106 into ground station 108. This is done until second pulley 110 returns to substantially the set-point position along track 116, an equilibrium position as detected by sensor 114. Sensor 114 then outputs a control signal to the motor and the motor is then stopped.

Conversely, if sensor 114 detects second pulley 110 moving away from substantially the set-point position along linear track 116 towards the second position 110' of second pulley 110, this indicates that the tension experienced by tether 106 is increasing; it is overcoming the force applied by tensioning spring 112. Sensor 114 outputs a signal causing the motor to reel tether 106 out from ground station 108 until the sensor 114 indicates that second pulley 110 has returned to the substantial set-point along linear track 116. System 100 makes use of a proportional integral derivative (PID) loop to control the motor in response to outputs from sensor 114. The motor is then stopped. As can be seen system 100 continuously adjusts the positioning of second pulley 100 to force the distance of second pulley 100 from the setpoint to approach zero.

The linear travel length is determined as a function of the inertia of the spool, the torque of the motor, the ascent and descent rates of the UAV and the constant tension spring rate. By utilizing a linear spring combined with a relatively long linear travel path, tensioning adjustments may be made in substantially real time to maintain a constant tension on the tether. The travel length should be long enough to enable the motor to transition from full speed clockwise to full speed counter clockwise (and vice versa) without either introducing slack in the tether, or allowing the translatable pulley to reach either end of its range, which would introduce a sudden increase in tether tension; a jerk motion.

The closed-loop PID control is necessary to overcome the natural delays in the operation of this type of system. This functionality is necessary in an environment in which a sufficiently useful tether management system must be capable of storing a large amount of tether on a single spool because such a spool will have high inertia. The motor will require a significant amount of time to either start rotating, stop rotating or change its direction of rotation.

In another embodiment, the set-point position may be varied to overcome changing operational and environmental conditions. A change in set-point position alters the effective tension placed on the tether 106. As an example, it may be desired to increase tension during a landing operation. The control system can select a set-point position closer towards position 110' this increases the effective tension on the tether 114. The PID control system will then operate to keep the position of the second pulley 110 closer to position 110' thereby increasing the tension on the tether 114.

By utilizing the pulley-spring arrangement described above, a simple yet effective structure and method for maintaining constant tension on a tether, regardless of the attitude of the UAV to which is attached, is provided. The system will reel tether in or out as required by the UAV. This is done even while simplifying and reducing the amount of work an operator must put forth, minimizing required training as well as the time between set up and launch.

While this invention has been particularly shown and described to reference the preferred embodiments thereof, it would be understood by those skilled in the art that various derivatives and changes in form and detail may be made therein without departing from the spirit and the scope of the invention, by the appended claims.

What is claimed is:

1. A constant tension tether management system for tethered aircraft comprising:
   a ground station for operatively coupling to an unmanned aerial vehicle;
   wherein the ground station includes a spool rotatably disposed within the ground station and adapted to support a tether thereon, a first pulley rotatably mounted within the ground station along a tether travel path, a second pulley being rotatably disposed within the ground station and moving in translation between a first position and a second position along the tether travel path, the first pulley being disposed along the tether travel path between the spool and the second pulley;
   a tension spring operatively connected to the second pulley, biasing the second pulley to a predetermined position; and
   a sensor, operatively coupled to the spool, for determining the position of the second pulley relative to a set point and outputting a control signal for controlling operation of the spool causing the return of the second pulley substantially to the set point;
   wherein the tensioning spring is a variable tension spring coupled to the second pulley for biasing the second pulley towards the first position.

2. The constant tension tether management system for tethered aircraft of claim 1, wherein the second pulley moves in translation within the ground station as a function of a change in tension exhibited by a tether.

3. The constant tension tether management system for tethered aircraft of claim 1, further comprising:
   an unmanned aerial vehicle; and a tether, disposed in the ground station, and extending from the ground station to operatively couple the unmanned aerial vehicle to the ground station.

4. The constant tension tether management system for tethered aircraft of claim 1, wherein the tensioning spring is a constant tension spring coupled to the second pulley for biasing the second pulley towards the first position.

5. The constant tension tether management system for tethered aircraft of claim 1, further comprising a linear track, the second pulley being disposed on the linear track, and the second pulley being movable between the first position and the second position along the linear track.

6. The constant tension tether management system for tethered aircraft of claim 1, wherein movement of the second pulley towards the first position indicates a decrease in tension of the tether.

7. The constant tension tether management system for tethered aircraft of claim 1, wherein movement of the second pulley towards the second position indicates an increase in tension of the tether.

8. The constant tension tether management system for tethered aircraft of claim 1, wherein the sensor causes the spool to rotate in one of a first direction or second direction as a function of a sensed position of the second pulley.

9. The constant tension tether management system for tethered aircraft of claim 1, wherein the tether extends about the second pulley for substantially one hundred and eighty degrees.

10. The constant tension tether management system for tethered aircraft of claim 9, further comprising a linear track, the second pulley being disposed on the linear track, and the second pulley being movable between the first position and the second position along the linear track.

11. The constant tension tether management system for tethered aircraft of claim 10, wherein movement of the second pulley towards the first position indicates a decrease in tension of the tether and movement of the second pulley towards the second position indicates an increase in tension of the tether.

12. The constant tension tether management system for tethered aircraft of claim 9, wherein the sensor causes the spool to rotate in one of a first direction or second direction as a function of a sensed position of the second pulley.

* * * * *